United States Patent
Yang

(10) Patent No.: US 11,078,369 B2
(45) Date of Patent: Aug. 3, 2021

(54) CORROSION-RESISTANCE IMPROVED POWDER PAINT FOR ALUMINUM WHEELS

(71) Applicants: Hyundai Motor Company, Seoul (KR); Kia Motors Corporation, Seoul (KR)

(72) Inventor: Ji-Won Yang, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 169 days.

(21) Appl. No.: 16/408,081

(22) Filed: May 9, 2019

(65) Prior Publication Data
US 2020/0172738 A1    Jun. 4, 2020

(30) Foreign Application Priority Data
Dec. 3, 2018  (KR) .................. 10-2018-0153879

(51) Int. Cl.
| | |
|---|---|
| C09D 5/08 | (2006.01) |
| C09D 5/03 | (2006.01) |
| C09D 7/63 | (2018.01) |
| C09D 133/10 | (2006.01) |
| C08K 5/098 | (2006.01) |
| C08K 5/092 | (2006.01) |
| C08K 5/1515 | (2006.01) |
| C08K 5/00 | (2006.01) |
| C08L 33/08 | (2006.01) |
| C08L 33/10 | (2006.01) |

(52) U.S. Cl.
CPC ............... C09D 5/08 (2013.01); C08K 5/098 (2013.01); C09D 5/03 (2013.01); C09D 7/63 (2018.01); C09D 133/10 (2013.01); *C08K 5/005* (2013.01); *C08K 5/092* (2013.01); *C08K 5/1515* (2013.01); *C08K 2201/014* (2013.01); *C08L 33/08* (2013.01); *C08L 33/10* (2013.01)

(58) Field of Classification Search
CPC .......... C08K 5/005; C08K 5/09; C08K 5/098; C08K 5/092; C09D 5/08; C09D 5/086; C09D 5/03; C09D 5/033; C09D 5/038; C09D 133/10; C09D 133/08; C09D 7/63; C09D 7/48; C09D 4/06; C08L 33/08; C08L 33/10

See application file for complete search history.

(56) References Cited

U.S. PATENT DOCUMENTS

| | | | | |
|---|---|---|---|---|
| 5,270,416 A | * | 12/1993 | Toman | ............... C09D 133/068 524/904 |
| 5,663,240 A | * | 9/1997 | Simeone | ............ C09D 133/068 525/327.3 |
| 5,728,790 A | * | 3/1998 | Seki | ................... C09D 133/068 526/273 |

(Continued)

*Primary Examiner* — Jane L Stanley
(74) *Attorney, Agent, or Firm* — Slater Matsil, LLP

(57) ABSTRACT

The present invention relates to a powder paint for aluminum wheels, and more particularly, to a curing agent. The corrosion-resistance improved powder paint for aluminum wheels, which is the present invention, includes 70 to 80 wt % of an acrylic resin, 8 to 12 wt % of dodecanedioic acid, and 3 to 10 wt % of sebacic acid, and the corrosion resistance of the powder paint is improved according to the composition of the present invention, so that it is possible to reduce occurrence and diffusion of corrosion on corner pails.

16 Claims, 7 Drawing Sheets

(56) References Cited

U.S. PATENT DOCUMENTS

| | | | | |
|---|---|---|---|---|
| 6,008,301 A | * | 12/1999 | Miyawaki | C09D 133/068 525/327.3 |
| 6,180,726 B1 | * | 1/2001 | Eklund | C08G 59/42 427/372.2 |
| 6,649,700 B2 | * | 11/2003 | Yabuta | C08G 59/4207 525/117 |
| 2002/0102406 A1 | * | 8/2002 | Muthiah | C09D 167/00 428/413 |

* cited by examiner

CORROSION-RESISTANCE IMPROVED POWDER PAINT FOR ALUMINUM WHEELS

CROSS-REFERENCE TO RELATED APPLICATIONS

This application claims priority to Korean Patent Application No. 10-2018-0153879, filed in the Korean Intellectual Property Office on Dec. 3, 2018, which application is hereby incorporated herein by reference.

TECHNICAL FIELD

The present invention relates to a powder paint for aluminum wheels, and more particularly, to a curing agent.

BACKGROUND

Aluminum wheels may be largely divided into a non-processing type and a processing type. The processing type is a technology that implements a texture inherent to aluminum by mechanically processing a front design part. The demand trend for a processed wheel with a metal texture having a cold and sharp image has globally increased.

FIG. 1(A) is a schematic view before processing a front part of a processing wheel, and FIG. 1(B) is a schematic view after processing a front part of a processing wheel. Referring to FIGS. 1(A) and 1(B), the processing type wheel exhibits a metallic texture by coating an aluminum substrate 10 with a primer 20 and a base 30 in order to prevent corrosion of the wheel and impart aesthetic appearance to the wheel, mechanically processing only the front part of the wheel to expose the aluminum substrate 10, and then finishing the aluminum substrate 10 with a transparent clear 40.

The processing wheel may implement an aluminum metallic texture by coating one transparent clear layer at a front processed site, but is disadvantageous in that it is vulnerable to occurrence and diffusion of corrosion because the thickness of the coating film is small and it is difficult to secure the thickness of a clear coating film on corner sites as compared to a non-processing type wheel in which an aluminum substrate is coated with a primer, a base, and a clear.

FIG. 2(A) is a photograph of a processing wheel in the related art, FIG. 2(B) is a photograph in which an outer part (R1) of FIG. 2(A) is enlarged, FIG. 2(C) is a photograph in which the center part (R2) of FIG. 2(B) is enlarged, and FIG. 2(D) is a photograph in which corner parts of the wheel in the related art are captured. Referring to FIGS. 2(A) to 2(D), it can be seen that the wheel is corroded from the outer part (R1) and the center part (R2), and that a coating film is insufficiently formed on the corner parts.

SUMMARY

Embodiments of the present invention can improve corrosion resistance. Particular embodiments can reduce occurrence and diffusion of corrosion on the corner parts by newly devising the composition of a powder paint.

To achieve the object, the present invention includes 70 to 80 wt % of an acrylic resin, 8 to 12 wt % of dodecanedioic acid, and 3 to 10 wt % of sebacic acid.

Preferably, the present invention may further include 2 to 5 wt % of 2,3-epoxypropyl methacrylate.

Preferably, the present invention may further include 1 to 5 wt % of a pinhole preventing agent.

Preferably, the present invention may further include 0.5 to 2 wt % of a surface conditioning agent.

Preferably, the present invention may further include 0.5 to 2 wt % of a light stabilizer.

According to the composition of a powder paint which is the present invention, corrosion resistance may be improved, and particularly, it is possible to reduce occurrence and diffusion of corrosion on the corner parts.

DETAILED DESCRIPTION OF ILLUSTRATIVE EMBODIMENTS

Hereinafter, the present invention will be described in detail. However, the present invention is not limited or restricted by exemplary embodiments, objects and effects of the present invention will be naturally understood or become apparent from the following description, and the objects and effects of the present invention are not limited by only the following description. Further, in the description of the present invention, when it is determined that the detailed description for the publicly-known technology related to the present invention can unnecessarily obscure the gist of the present invention, the detailed description thereof will be omitted.

TABLE 1

| Classification | Composition range (wt %) | | | |
| --- | --- | --- | --- | --- |
| | Acrylic resin | Dodecanedioic acid | Sebacic acid | 2,3-epoxypropyl methacrylate |
| Present invention | 70~80 | 8~12 | 3~10 | 2~5 |
| Related art | 70~80 | 10~20 | — | — |

Table 1 is a table comparing the composition of the powder paint which is the present invention with the composition of the powder paint in the related art. Referring to Table 1, the compositions of the acrylic resins are the same as each other, but the present invention includes dodecanedioic acid in an amount smaller than that of dodecanedioic acid in the related art, and includes sebacic acid and 2,3-epoxypropyl methacrylate which are not included in the related art.

More specifically, the powder paint which is the present invention includes 70 to 80 wt % of an acrylic resin, 8 to 12 wt % of dodecanedioic acid, and 3 to 10 wt % of sebacic acid. Further, the powder paint which is the present invention may further include 2 to 5 wt % of 2,3-epoxypropyl methacrylate.

The acrylic resin is added to implement main physical properties such as corrosion resistance, and when the acrylic resin is added in an amount of less than 70 wt %, main physical properties such as corrosion resistance deteriorate, and when the acrylic resin is added in an amount of more than 80 wt %, the workability deteriorates. Accordingly, it is preferred that the acrylic resin is added in an amount of 70 to 80 wt %.

Dodecanedioic acid is one of the representative curing agents crosslinked by being reacted with epoxy rings in the acrylic resin, and the crosslinking density varies according to the content of dodecanedioic acid. When dodecanedioic acid is added in an amount of less than 8 wt %, attachment property and corrosion resistance deteriorate, and even when dodecanedioic acid is added in an amount of more than 12 wt %, attachment property and corrosion resistance deteriorate. Accordingly, it is preferred that dodecanedioic acid is added in an amount of 8 to 12 wt %.

Figure 1A:
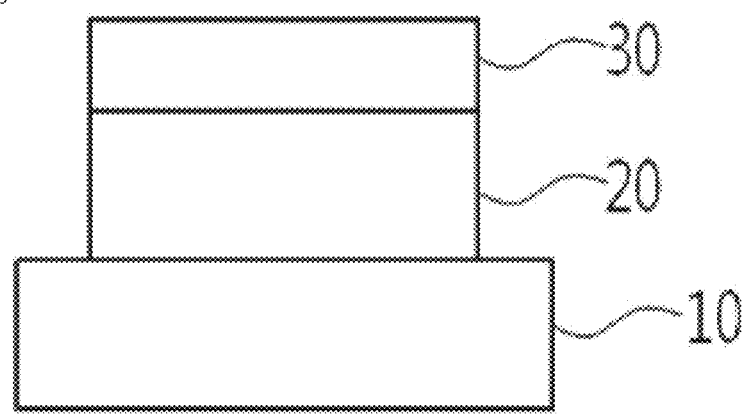
FIG. 1(A) is a schematic view before processing a front part of a processing wheel.
Figure 1B:
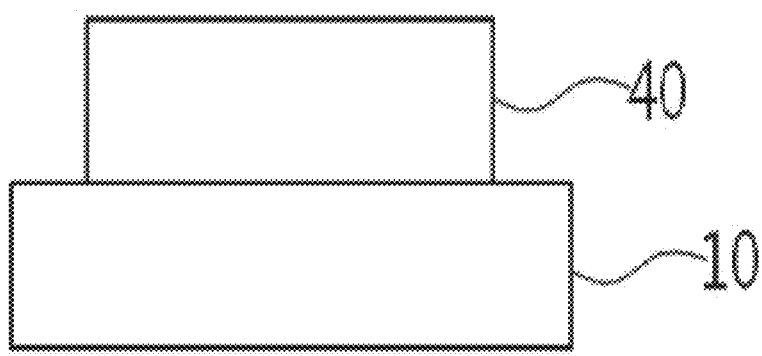
FIG. 1(B) is a schematic view after processing a front part of a processing wheel.
Figure 2A:
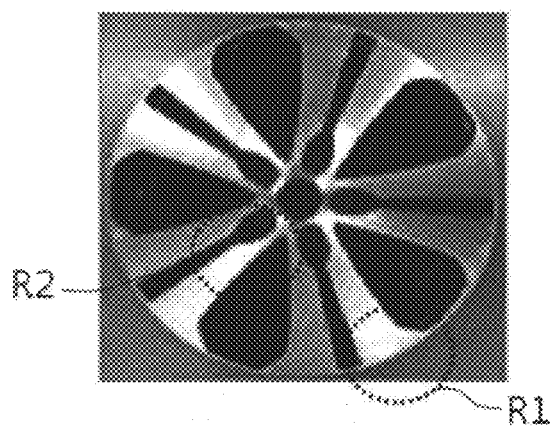
FIG. 2(A) is a photograph of a processing wheel in the related art.
Figure 2B:
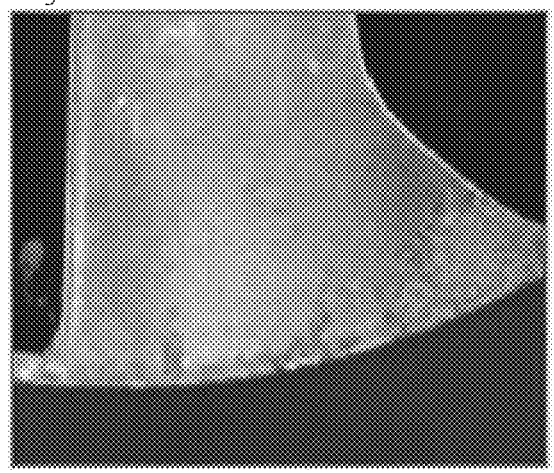
FIG. 2(B) is a photograph in which an outer part (R1) of FIG. 2(A) is enlarged.
Figure 2C:
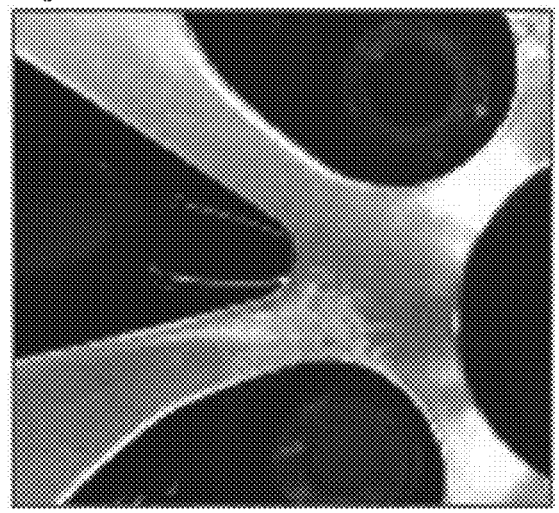
FIG. 2(C) is a photograph in which the center part (R2) of FIG. 2(B) is enlarged.
Figure 2D:
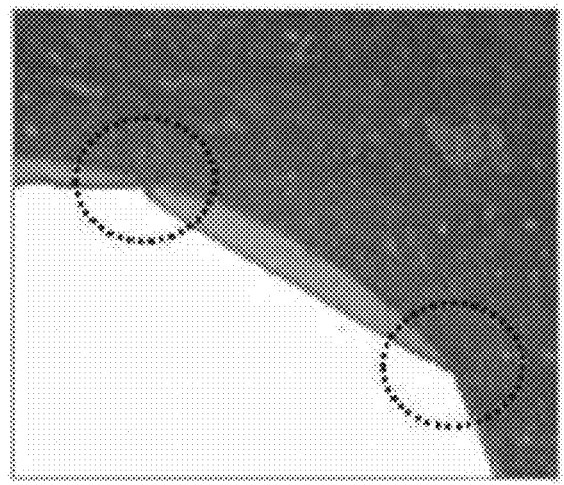
FIG. 2(D) is a photograph in which corner parts of the wheel in the related art are captured.
Figure 3A:
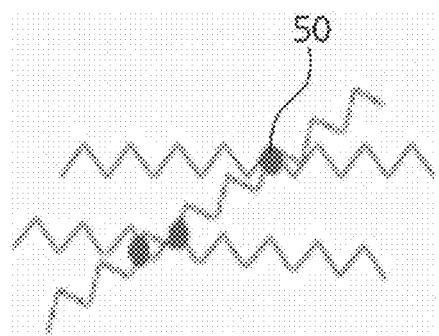
FIG. 3(A) is a schematic view illustrating crosslink points of a powder paint in the related art.
Figure 3B:
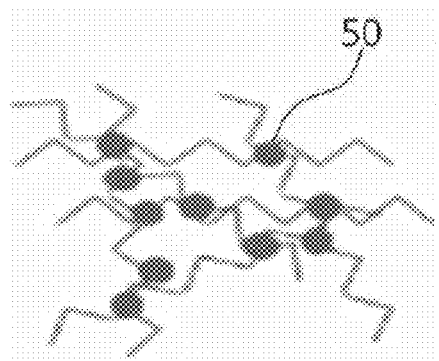
FIG. 3(B) is a schematic view illustrating crosslink points of the powder paint which is the present invention.

The addition reason and composition range of sebacic acid will be described with reference to FIGS. 3(A) and 3(B), referred to collectively as FIG. 3. FIG. 3(A) is a schematic view illustrating crosslink points of a powder paint in the related art, and FIG. 3(B) is a schematic view illustrating crosslink points of the powder paint which is the present invention.

Referring to FIG. 3, the molecular weight of sebacic acid is 202.25 mol/g, which is less than 230.3 mol/g, which is a molecular weight of dodecanedioic acid, so that the chain length of sebacic acid is relatively shorter than that of dodecanedioic acid. The shorter the chain length is, the higher the number of crosslink points is, so that it is possible to reduce permeation of moisture, salts and the like, and occurrence of initial corrosion. When sebacic acid is added in an amount of less than 3 wt %, the powder paint is not cured, and when sebacic acid is added in an amount of more than 10 wt %, attachment property deteriorates, so that it is preferred that sebacic acid is added in an amount of 3 to 10 wt %.

Figure 4A:
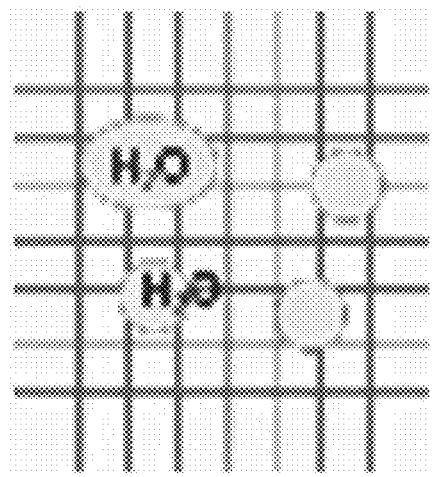
FIG. 4(A) is a schematic view illustrating the crosslinking density of a powder paint in the related art.
Figure 4B:
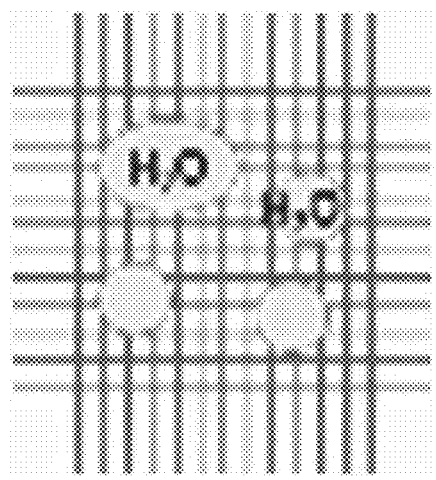
FIG. 4(B) is a schematic view illustrating the crosslinking density of the powder paint which is the present invention.

The reason for adding sebacic acid may also be described through FIG. 4. FIG. 4(A) is a schematic view illustrating the crosslinking density of a powder paint in the related art, and FIG. 4(B) is a schematic view illustrating the crosslinking density of the powder paint which is the present invention.

Referring to FIGS. 4(A) and 4(B), as a curing agent having a molecular weight smaller than the molecular weight of dodecanedioic acid is not added to a powder paint in the related art, the crosslinking density is not high, so that the powder paint cannot block permeation of moisture, salts, and the like, and as a result, corrosion is caused, but the present invention have crosslinking density improved by the addition of sebacic acid, and thus can block permeation of moisture, salts, and the like.

The role of 2,3-epoxypropyl methacrylate is also the same as that of sebacic acid. Since the molecular weight of 2,3-epoxypropyl methacrylate is 142.15 mol/g, which is smaller than those of dodecanedioic acid and sebacic acid and the chain length of 2,3-epoxypropyl methacrylate is short, the number of crosslink points and the crosslinking density are improved, so that it is possible to block permeation of moisture, salts, and the like.

Figure 5A:
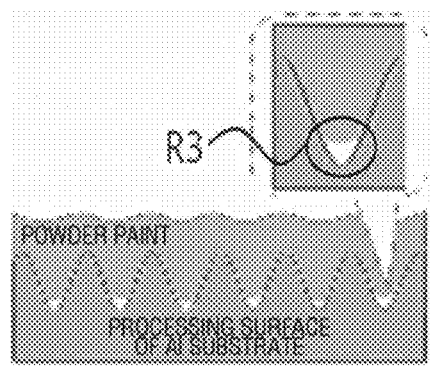
FIG. 5(A) illustrates an uncoated region during the coating of the powder paint in the related art.
Figure 5B:
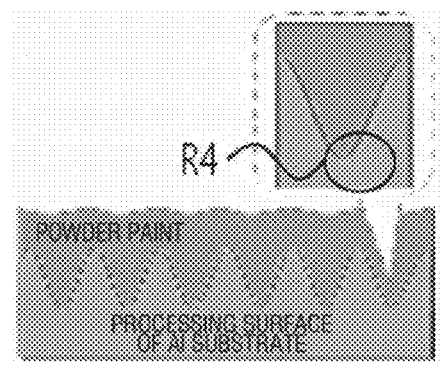
FIG. 5(B) illustrates a coated region during the coating of the powder paint which is the present invention.

Meanwhile, another role of 2,3-epoxypropyl methacrylate will be described with reference to FIG. 5. FIG. 5(A) illustrates an uncoated region during the coating of the powder paint in the related art, and FIG. 5(B) illustrates a coated region during the coating of the powder paint which is the present invention.

Referring to FIG. 5, 2,3-epoxypropyl methacrylate is a low-viscosity curing agent, and may reduce the corrosion diffusion rate by increasing fluidity to improve attachment strength between the aluminum substrate and the paint (that is, improvement of wetting property). According to an exemplary embodiment of the present invention, as 2,3-epoxypropyl methacrylate is added, the fluidity of the powder paint to the clear coating film is increased from 93 mm to no mm (based on 138° C.).

When 2,3-epoxypropyl methacrylate is added in an amount of less than 2 wt %, an effect of improving attachment strength is insignificant, and when 2,3-epoxypropyl methacrylate is added in an amount of more than 5 wt %, the chipping resistance becomes disadvantageous. Accordingly, it is preferred that 2,3-epoxypropyl methacrylate is added in an amount of 2 to 5 wt %.

The present invention may further include 1 to 5 wt % of a pinhole preventing agent. A component of the pinhole preventing agent is an acrylic copolymer, and is added to prevent surface pinholes. When the pinhole preventing agent is added in an amount of less than 1 wt %, the probability that pinholes occur during the curing of the paint is increased, and when the pinhole preventing agent is added in an amount of more than 5 wt %, the quality of the appearance surface deteriorates.

The present invention may further include 0.5 to 2 wt % of a surface conditioning agent. A component of the surface conditioning agent is a silicone modified acryl, and is added to secure paint smoothness. When the surface conditioning agent is added in an amount of less than 0.5 wt %, paint smoothness deteriorates, and when the surface conditioning agent is added in an amount of more than 2 wt %, the flowing of the paint occurs, and as a result, the quality of the appearance surface deteriorates.

The present invention may further include 0.5 to 2 wt % of a light stabilizer. A component of the light stabilizer is a benzophenol derivative, and is added to prevent aging of the coating film by UV rays. When the light stabilizer is added in an amount of less than 0.5 wt %, cracks and the like may occur on the surface of the coating film by UV rays, and when the light stabilizer is added in an amount of more than 2 wt %, the quality of the appearance surface, such as gloss may deteriorate.

TABLE 2

| Composition | Related art | Example 1 | Example 2 | Example 3 | Example 4 | Example 5 | Example 6 | Example 7 |
|---|---|---|---|---|---|---|---|---|
| Acrylic resin | 78 | 78 | 78 | 78 | 78 | 78 | 78 | 78 |
| Dodecanedioic acid | 18 | 8 | 10 | 12 | 10 | 10 | 10 | 10 |
| Sebacic acid | — | 10 | 8 | 6 | 6 | 5 | 4 | 3 |
| 2,3-epoxypropyl methacrylate | — | — | — | — | 2 | 3 | 4 | 5 |
| Pinhole preventing agent | 2 | 2 | 2 | 2 | 2 | 2 | 2 | 2 |
| Surface conditioning agent | 1 | 1 | 1 | 1 | 1 | 1 | 1 | 1 |
| Light stabilizer | 1 | 1 | 1 | 1 | 1 | 1 | 1 | 1 |
| Total | 100 | 100 | 100 | 100 | 100 | 100 | 100 | 100 |

TABLE 3

| Composition | Comparative Example 1 | Comparative Example 2 | Comparative Example 3 | Comparative Example 4 | Comparative Example 5 |
|---|---|---|---|---|---|
| Acrylic resin | 78 | 78 | 78 | 78 | 78 |
| Dodecanedioic acid | 6 | 14 | 10 | 10 | 10 |
| Sebacic acid | 12 | 4 | 7 | 2 | 1 |
| 2,3-epoxypropyl methacrylate | — | — | 1 | 6 | 7 |
| Pinhole preventing agent | 2 | 2 | 2 | 2 | 2 |
| Surface conditioning agent | 1 | 1 | 1 | 1 | 1 |
| Light stabilizer | 1 | 1 | 1 | 1 | 1 |
| Total | 100 | 100 | 100 | 100 | 100 |

Table 2 is a table summarizing the compositions of the powder paint in the related art and Examples 1 to 7 of the present invention, and Table 3 is a table summarizing the compositions of Comparative Examples 1 to 5 of the present invention.

TABLE 4

| Evaluation result | | Related art | Example 1 | Example 2 | Example 3 | Example 4 | Example 5 | Example 6 | Example 7 |
|---|---|---|---|---|---|---|---|---|---|
| Hardness | | F | F | F | F | F | F | F | F |
| Water resistance/ moisture resistance | | M-1 | M-2.5 | M-1 | M-2 | M-1 | M-1 | M-2 | M-2.5 |
| Weather resistance | | good | good | good | good | good | good | good | good |
| Chipping resistance | | good | good | good | good | good | good | good | good |
| Salt spray resistance | | good | good | good | good | good | good | good | good |
| Corrosion resistance | 120 Hr | good | good | good | good | good | good | good | good |
| | 240 Hr | good | good | good | good | good | good | good | good |
| | 360 Hr | 4 mm | 3 mm | 3 mm | 3 mm | 1.5 mm | 2 mm | 2 mm | 2mm |

TABLE 5

| Evaluation result | | Comparative Example 1 | Comparative Example 2 | Comparative Example 3 | Comparative Example 4 | Comparative Example 5 |
|---|---|---|---|---|---|---|
| Hardness | | F | F | F | F | F |
| Water resistance/ moisture resistance | | M-3.5 | M-2.5 | M-2 | M-2.5 | M-2.5 |
| Weather resistance | | M-3 | good | good | good | good |
| Chipping resistance | | good | good | good | NG | NG |
| Salt spray resistance | | good | good | good | good | good |
| Corrosion resistance | 120 Hr | good | good | good | good | good |
| | 240 Hr | 3 mm | good | good | good | good |
| | 360 Hr | 5 mm | 4 mm | 4 mm | 2.5 mm | 3 mm |

Tables 4 and 5 are tables summarizing the evaluation results of the powder paint in the related art, Examples 1 to 7, and Comparative Examples 1 to 5. Each evaluation item in Tables 4 and 5 needs to satisfy the criteria as follows. The hardness, water resistance/moisture resistance, weather resistance, chipping resistance, and salt spray resistance are HB or more, attachment property of M-2.5 or more, attachment property of M-2.5 or more, coating film does not peel off, and 720 Hr or more, respectively. The corrosion resistance is a CASS corrosion resistance evaluation method, and the maximum corrosion width is measured according to the time and compared.

Referring to Tables 2 to 5, although Examples 1 to 3 did not include 2,3-epoxypropyl methacrylate, the corrosion width was shown to be narrower than that of the powder paint in the related art at 360 Hr in the CASS corrosion resistance evaluation, and the corrosion widths of Examples 4 to 7 including 2,3-epoxypropyl methacrylate were 2 mm or less at 360 Hr in the CASS corrosion resistance evaluation, exhibiting better corrosion resistance effects by two times or more than the related art. Through this, it can be seen that when sebacic acid is added alone or is added with 2,3-epoxypropyl methacrylate, the corrosion resistance effects are improved.

Since the CASS corrosion resistance evaluation of Comparative Example 1 in which the compositions of dodecanedioic acid and sebacic acid of the present invention are not satisfied, Comparative Example 2 in which the composition of dodecanedioic acid of the present invention is not satisfied, and Comparative Example 3 in which the composition of 2,3-epoxypropyl methacrylate of the present invention is not satisfied is not comparable with the corrosion resistance evaluation of the Example, it can be seen that the composition range of the present invention needs to be satisfied in order to achieve the corrosion resistance improvement effects.

It can be seen that in the case of Comparative Examples 4 and 5 in which the compositions of sebacic acid and 2,3-epoxypropyl methacrylate of the present invention are not satisfied, the corrosion resistance improvement effects are exhibited, but the chipping resistance is disadvantageous. Through this, it can be seen that the composition of 2,3-epoxypropyl methacrylate of the present invention needs to be satisfied in order to secure not only the corrosion resistance effects, but also chipping resistance.

Figure 6A:
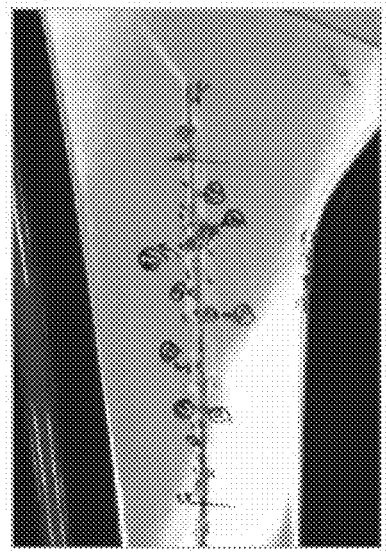
FIG. 6(A) illustrates a result of evaluating corrosion resistance for the example of the powder paint in the related art.
Figure 6B:
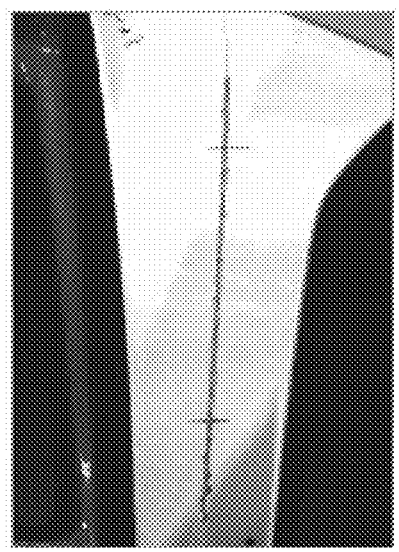
FIG. 6(B) illustrates a result of evaluating corrosion resistance for the example of the powder paint which is the present invention.

FIG. 6(A) illustrates a result of evaluating corrosion resistance for the example of the powder paint in the related art, and FIG. 6(B) illustrates a result of evaluating corrosion resistance for the example of the powder paint which is the present invention. Referring to FIGS. 6(A) and 6(B), the point where corrosion of the wheel corner site with a small coating film thickness occurs in the related art is at a point of 240 Hr, and the point of the present invention is at a point of 400 Hr. Through this, it can be confirmed that permeation of moisture and salts and occurrence of initial corrosion are suppressed by improving the crosslinking density of the resin as compared to the existing clear paint.

After the aluminum substrate was exposed by cutting the processing site with a knife, the CASS corrosion resistance test was performed. The CASS corrosion resistance test is performed to confirm how much corrosion is diffused after deliberately causing corrosion, and as a result of evaluation, the corrosion width was 3 mm and it takes two or more times longer in the case of the present invention than the related art, meaning that the wetting property of the paint is improved, thereby contributing to the reduction in corrosion diffusion rate while improving attachment strength between the aluminum substrate of the processing part and the paint.

In general, in order to improve corrosion resistance, the amount of paint discharged may be increased in the production line or a coating film may be thickly formed by coating the processing site with a double layer (2 coat), but this method accompanies a problem of increase in costs. In contrast, according to the present invention, corrosion resistance may be improved by coating a processing site with only one layer (1 coat) without any change in constitution of the coating film and process. Furthermore, the present invention can be applied to various surface treatment specifications and when the present invention is also applied to a sputtering wheel which may be vulnerable to corrosion in addition to a front surface processing wheel, it is possible to expect that corrosion resistance is improved and corrosion claim is reduced.

The present invention has been described in detail through representative Examples, but it is to be understood by a person with ordinary skill in the art to which the present invention pertains that various modifications are possible in the above-described Examples within the range not departing from the scope of the present invention. Therefore, the scope of the present invention should not be limited to the above-described Examples but should be determined by not only the claims to be described below but also all the changes or modified forms derived from the claims and the equivalent concept thereof.

What is claimed is:

1. A corrosion-resistance powder paint for aluminum wheels, the corrosion-resistance powder paint comprising 70 to 80 wt % of an acrylic resin, 8 to 12 wt % of dodecanedioic acid, 3 to 10 wt % of sebacic acid, and 2 to 5 wt % of 2,3-epoxypropyl methacrylate.

2. The corrosion-resistance powder paint of claim 1, further comprising 1 to 5 wt % of a pinhole preventing agent.

3. The corrosion-resistance powder paint of claim 2, further comprising 0.5 to 2 wt % of a surface conditioning agent.

4. The corrosion-resistance powder paint of claim 2, further comprising 0.5 to 2 wt % of a light stabilizer.

5. The corrosion-resistance powder paint of claim 1, further comprising 0.5 to 2 wt % of a surface conditioning agent.

6. The corrosion-resistance powder paint of claim 5, further comprising 0.5 to 2 wt % of a light stabilizer.

7. The corrosion-resistance powder paint of claim 1, further comprising 0.5 to 2 wt % of a light stabilizer.

8. A method of manufacturing an aluminum wheel, the method comprising coating a wheel substrate using the corrosion-resistance powder paint of claim 1.

9. A corrosion-resistance powder paint for aluminum wheels, the corrosion-resistance powder paint comprising:
  70 to 80 wt % of an acrylic resin,
  8 to 12 wt % of dodecanedioic acid,
  3 to 10 wt % of sebacic acid,
  2 to 5 wt % of 2,3-epoxypropyl methacrylate,
  1 to 5 wt % of a pinhole preventing agent,
  0.5 to 2 wt % of a surface conditioning agent, and
  0.5 to 2 wt % of a light stabilizer.

10. A corrosion-resistance powder paint for aluminum wheels, the corrosion-resistance powder paint comprising 70 to 80 wt % of an acrylic resin, 8 to 12 wt % of dodecanedioic acid, 6 to 10 wt % of sebacic acid, and 2 to 5 wt % of 2,3-epoxypropyl methacrylate.

11. The corrosion-resistance powder paint of claim 10, further comprising 1 to 5 wt % of a pinhole preventing agent.

12. The corrosion-resistance powder paint of claim 11, further comprising 0.5 to 2 wt % of a surface conditioning agent.

13. The corrosion-resistance powder paint of claim 12, further comprising 0.5 to 2 wt % of a light stabilizer.

14. The corrosion-resistance powder paint of claim 10, further comprising 0.5 to 2 wt % of a surface conditioning agent.

15. The corrosion-resistance powder paint of claim 14, further comprising 0.5 to 2 wt % of a light stabilizer.

16. The corrosion-resistance powder paint of claim 10, further comprising 0.5 to 2 wt % of a light stabilizer.

* * * * *